United States Patent
Wong et al.

(10) Patent No.: US 7,206,140 B2
(45) Date of Patent: *Apr. 17, 2007

(54) LENS, LENS ARRAY AND OPTICAL RECEIVER

(75) Inventors: Tom Sheau Tung Wong, Jalan Chempaka Puteh (SG); Adrianus J. P. van Haasteren, Signature Park (SG)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 10/983,567

(22) Filed: Nov. 8, 2004

(65) Prior Publication Data

US 2006/0098292 A1    May 11, 2006

(51) Int. Cl.
*G02B 13/18* (2006.01)
(52) U.S. Cl. .......................... 359/709; 385/31; 385/93
(58) Field of Classification Search ........ 359/708–712; 385/31, 33, 92, 93
See application file for complete search history.

(56) References Cited

U.S. PATENT DOCUMENTS

| | | | |
|---|---|---|---|
| 5,200,024 A * | 4/1993 | Blonder et al. ................ 216/24 |
| 5,515,468 A * | 5/1996 | DeAndrea et al. ............ 385/88 |
| 6,536,957 B1 * | 3/2003 | Buchter ........................ 385/89 |
| 6,961,489 B2 * | 11/2005 | Cox et al. ...................... 385/33 |
| 2003/0053222 A1 * | 3/2003 | Togami et al. .............. 359/726 |
| 2004/0091218 A1 | 5/2004 | Haasteren |

* cited by examiner

*Primary Examiner*—Hung Dang
*Assistant Examiner*—Joseph Martinez

(57) ABSTRACT

In one embodiment, a lens has an object surface and an image surface, with the shape of the image surface being defined by an equation having a conic component and a cone component. The lens may be incorporated into an optical receiver having a photodetector that is positioned to receive light emitted from the image surface of the lens. In some uses, the image surface of the lens mitigates return loss through the lens.

18 Claims, 4 Drawing Sheets

LENS, LENS ARRAY AND OPTICAL RECEIVER

BACKGROUND

There are many places where unwanted signal reflection (i.e., back-reflection) can occur in an optical communication system. Common places of signal reflection include optical fiber joins and optical fiber connectors and interfaces (e.g., at an optical receiver, where optical signals bombard the surface of a photodetector).

One possible byproduct of signal reflection is power loss (i.e., a reduction in optical signal strength as perceived by an optical receiver). Another possible byproduct is disruption of the light source (e.g., a light emitting diode (LED) or laser) that initiates optical communication. Disruption of a system's light source can lead to poor signal quality and noise. Yet another possible byproduct of signal reflection is ghost signals (i.e., spurious signals that are superimposed on an intended signal, or signal reflections that continue after an optical transmission has ceased). All of these byproducts (e.g., power loss, poor signal quality and ghost signals) increase the likelihood that an optical receiver will erroneously identify a false or non-existent signal, thereby corrupting a data transmission.

Back-reflections at an optical receiver are typically evaluated as "return loss", which is the ratio of incident signal power to reflected signal power. It is not uncommon for an optical receiver's return loss to be on the order of 30%.

Some of the problems associated with signal reflection can be overcome by introducing an optical isolator near an optical link's transmitter. However, for low cost transmitters, the addition of an isolator can be costly. Furthermore, isolators do not prevent ghost signals from being detected at a link's receiver.

Other techniques for reducing the problems associated with optical signal reflection include the introduction of optical circulators or diffractive lens components.

SUMMARY OF THE INVENTION

In one embodiment, a lens comprises an object surface and an image surface, with the shape of the image surface being defined by an equation having a conic component and a cone component.

In another embodiment, a lens array comprises a plurality of lenses molded into a common structure. Each lens comprises an object surface and an image surface, and the shape of at least some of the image surfaces is defined by an equation having a conic component and a cone component.

In yet another embodiment, an optical receiver comprises a lens and a photodetector. The lens has an object surface and an image surface, with the shape of the image surface being defined by an equation having a conic component and a cone component. The photodetector is positioned to receive light emitted from the image surface of the lens.

Other embodiments are also disclosed.

BRIEF DESCRIPTION OF THE DRAWINGS

Illustrative and presently preferred embodiments of the invention are illustrated in the drawings, in which.

DETAILED DESCRIPTION OF AN EMBODIMENT

Figure 1:
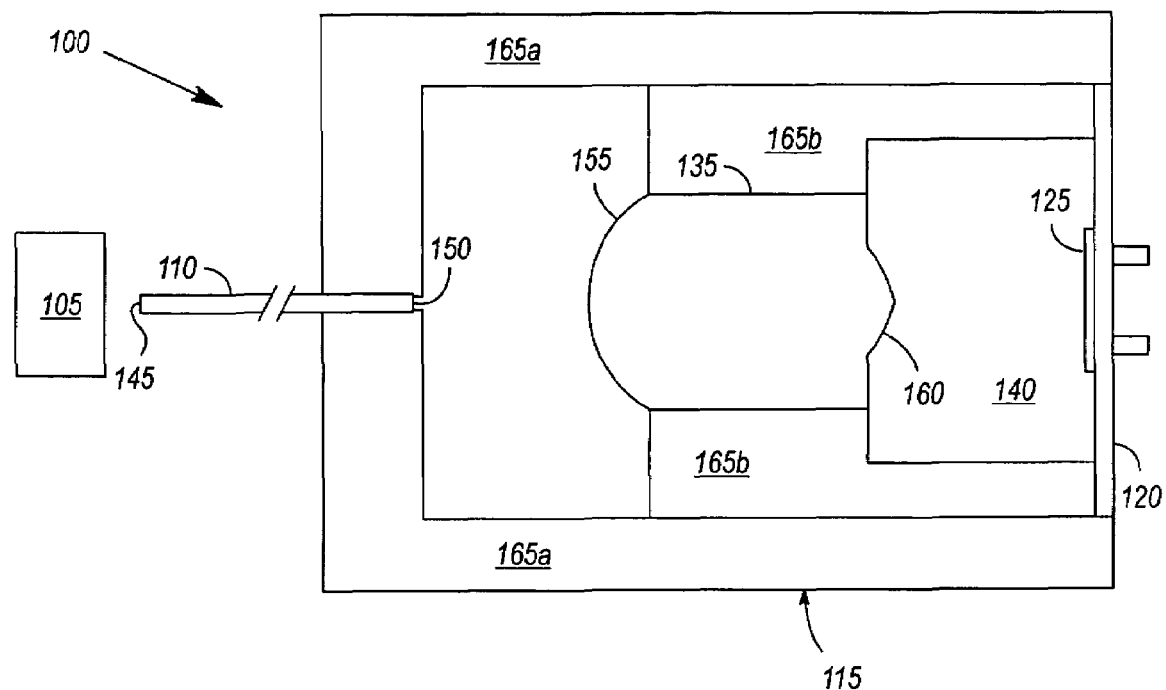
FIG. 1 illustrates an exemplary optical communication system.

FIG. 1 illustrates an exemplary optical communication system 100 comprising an optical transmitter 105, an optical fiber 110, and an optical receiver 115. The fiber 110 comprises a transmitter end face 145 that is optically coupled to the transmitter 105, and a receiver end face 150 that is optically coupled to the receiver 115. Depending on the application of the communication system 100, the fiber 110 may take the form of a multimode, single-mode or other type of fiber, such as, but not limited to, a 62.5/125 μm, 50/125 μm, or 100/140 μm multimode fiber, a 9/125 μm single-mode fiber, or a 200 μm HCS (Hard Clad Silica) fiber. By means of the fiber 110, the optical communication system 100 may transmit signals (e.g., data) between the transmitter 105 and the receiver 115.

The optical receiver 115 comprises a lens 135 and a photodetector 125. As shown, the photodetector 125 may be mounted to the base of a transistor outline (TO) can 120. The lens 135 and photodetector 125 may be held in position with respect to each other by means of a composite or multi-part housing 165a, 165b. The housing 165a, 165b holds at least the lens 135 and comprises features (e.g., depressions, receptacles, brackets or couplers) for positioning the photodetector 125 and optical fiber 110 with respect to the lens 135. In one embodiment, part or all of the housing (e.g., part 165b) is integrated with the lens 135. It is noted that the particular configuration of the housing 165a, 165b is not critical to this description, and only the housing's ability to position the lens 135, photodetector 125 and fiber 110 is significant. In the system 100, the housing 165b serves to define a cavity 140 (e.g., an air gap) between the lens 135 and photodetector 125.

The lens 135 comprises an object (input) surface 155 and an image (output) surface 160. The lens 135 is aligned so that object surface 155 receives incident light emitted from fiber 110 and image surface 160 emits light to photodetector 125.

The object surface 155 may be variously shaped, and in one embodiment is a convex surface such as a conic surface defined by the Equation 1 (below).

Figure 2:
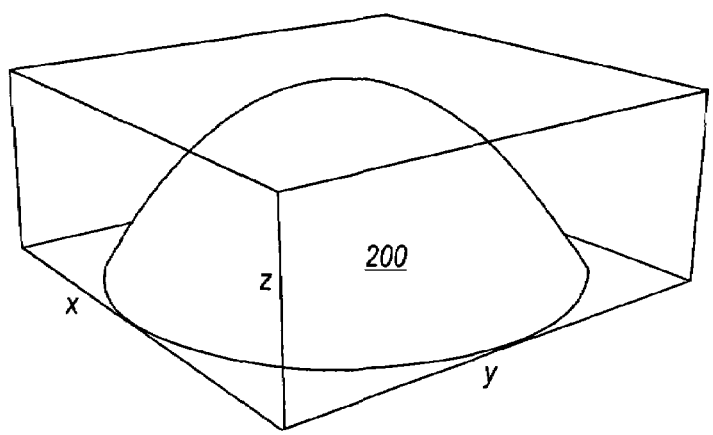
FIG. 2 illustrates an isometric view of an exemplary conic surface.

The image surface 160 is defined by an equation having a conic component and a cone component. FIG. 2 illustrates an isometric view of an exemplary conic surface 200. The exemplary conic surface illustrated in FIG. 2 is defined by the following equation:

$$z = \frac{c(x^2 + y^2)}{1 + \sqrt{1 - (1+k)c^2(x^2 + y^2)}} \quad \text{(Equation 1)}$$

where z is the sag or z-coordinate of the surface 200, where x and y are the lateral coordinates of the surface 200, where k is a conic constant, and where c is the reciprocal of the radius of curvature of the surface 200. By way of example, the conic component may be spherical, parabolic or hyperbolic.

Figure 3:
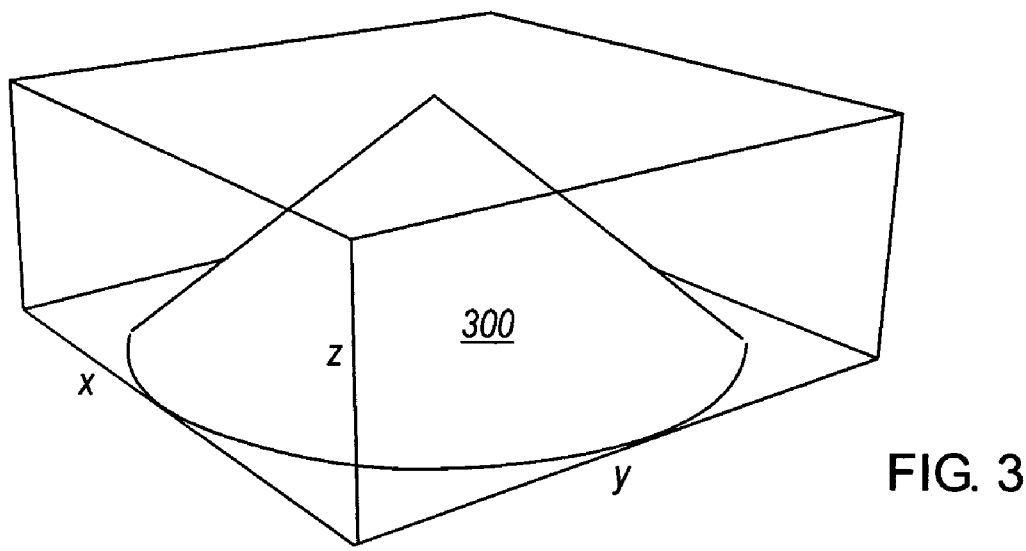
FIG. 3 illustrates an isometric view of an exemplary cone surface.

FIG. 3 illustrates an isometric view of an exemplary cone surface 300. The exemplary cone surface illustrated in FIG. 3 is defined by the following equation:

$$z = d\sqrt{x^2 + y^2} \quad \text{(Equation 2)}$$

where z is the sag or z-coordinate of the surface 300, where x and y are the lateral coordinates of the surface 300, and wherein d is a constant.

Figure 4:
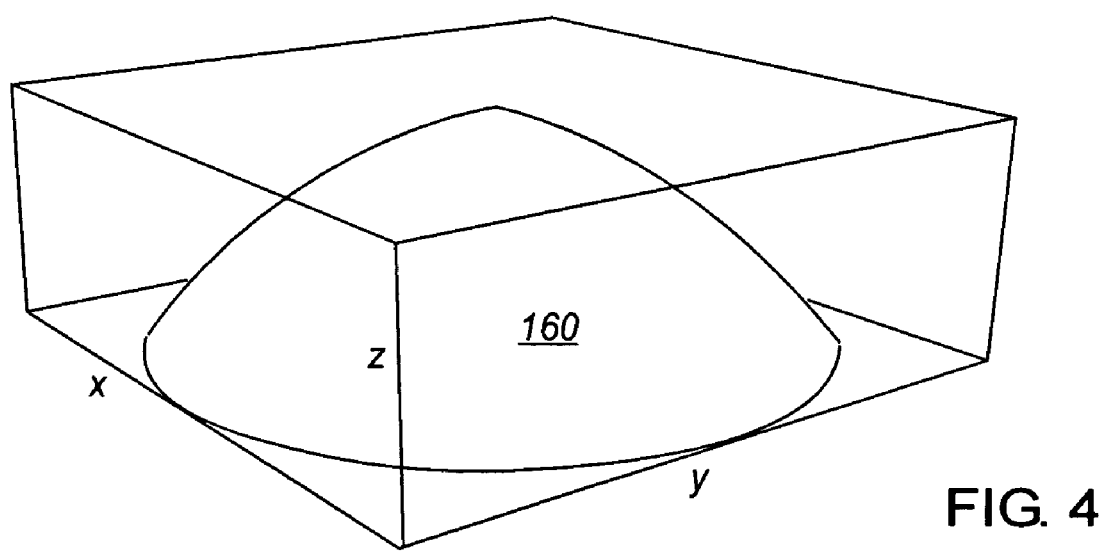
FIG. 4 illustrates an isometric view of an exemplary conic and cone combination surface.

FIG. 4 illustrates an isometric view of image surface 160. The image surface 160 is defined by an equation having a conic component and a cone component, as follows:

$$z = \frac{c(x^2 + y^2)}{1 + \sqrt{1 - (1+k)c^2(x^2 + y^2)}} + d\sqrt{x^2 + y^2} \quad \text{(Equation 3)}$$

Image surface 160 may also be described as a first order odd aspherical surface, as set forth in the following equation:

$$z = \frac{cr^2}{1 + \sqrt{1 - (1+k)c^2 r^2}} + \beta_1 r^1 \quad \text{(Equation 4)}$$

where r is the radial coordinate of the image surface 160, i.e., $\sqrt{x^2+y^2}$, and where $\beta_1$ is the first order constant of the odd asphere.

The surfaces 155, 160 of the lens 135, and specifically the image surface 160, may be optimized to mitigate return loss through the lens 135 for a particular optical fiber 110 (e.g., fiber type and core diameter), the light expected to be received via the optical fiber 110 (e.g., the light's wavelength, mode profile, and whether the light is produced by an LED or laser), and the locations at which the housing 165a, 165b positions the optical fiber 110 and photodetector 125 with respect to the lens 135. The surfaces 155, 160 may also be optimized for numerical aperture, coupling efficiency, and acceptable back-reflection.

Depending on its application, the lens 135, having an image surface 160 defined by an equation having a conic component and a cone component, can provide various useful functions. One function is to focus incident light onto the photodetector 125. Another function is to mitigate the re-entry of light reflected by the photodetector 125 into the fiber 110. By mitigating back-reflections in the receiver 115, signal reflections that can 1) interfere with the operation of the transmitter 105, or 2) create ghost signals, can be reduced to an acceptable level, thereby enabling increases in the reliability and maximum bandwidth of the system 100.

In one exemplary embodiment, the optic system 100 has the following characteristics: light source wavelength is 850 nm, fiber 110 is a multimode fiber having a core diameter of 62.5 μm and a cladding diameter of 125 μm, length of lens 135 is 0.8 mm between vertex of object surface 155 and vertex of image surface 160, diameter of object surface 155 is 0.5 mm, diameter of image surface 160 is 0.3 mm, distance between vertex of image surface 160 and photodetector 125 is 0.4 mm, distance between vertex of object surface 155 and receiver end face 150 of fiber 110 is 0.5 mm, the constants for image surface 160 are d=−0.23, k=0, and c=2 (radius of curvature of 0.5 mm; Equation 3), and the constants for the surface of object surface 155 of lens 135 are k=0 and c=4 (radius of curvature of 0.25 mm; Equation 1).

Figure 5A:
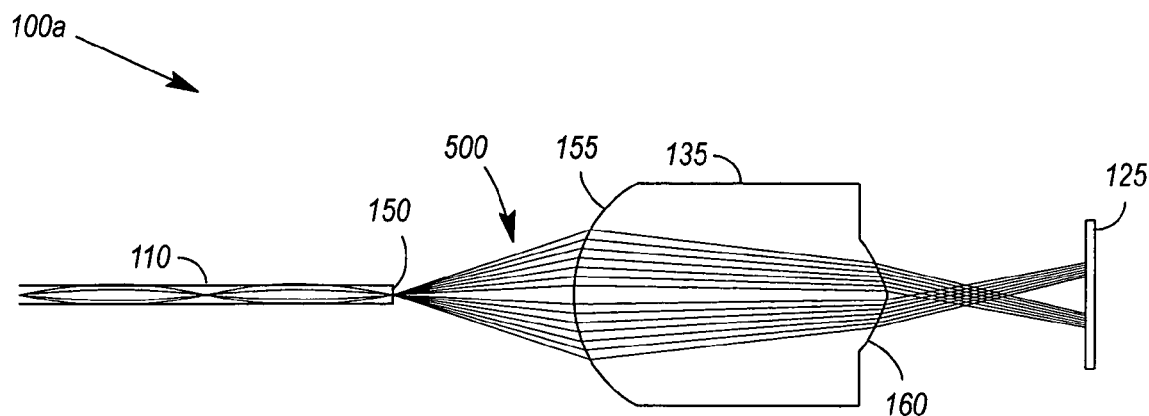
FIG. 5A illustrates a forward path ray tracing for a first exemplary embodiment of the system shown in FIG. 1.
Figure 5B:
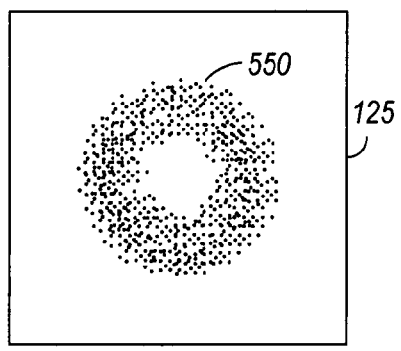
FIG. 5B illustrates the annular beam profile incident on the photodetector in the system shown in FIG. 5A.

FIG. 5A illustrates a forward path ray tracing 500 for the embodiment of the system 100 described in the above paragraph (system 100a). Transmitted light travels through fiber 110, into the lens 135 through object surface 155, and onto the photodetector 125 through the image surface 160 and cavity 140. FIG. 5B illustrates the annular beam profile of light 550 that is incident on the photodetector 125.

Figure 6B:
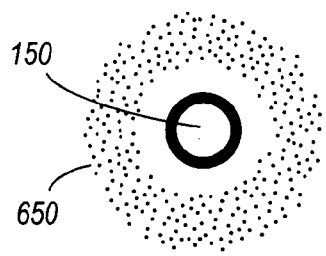
FIG. 6B illustrates the annular beam profile of back-reflected light at the receiver end face of the fiber shown in FIG. 5A.
Figure 6A:
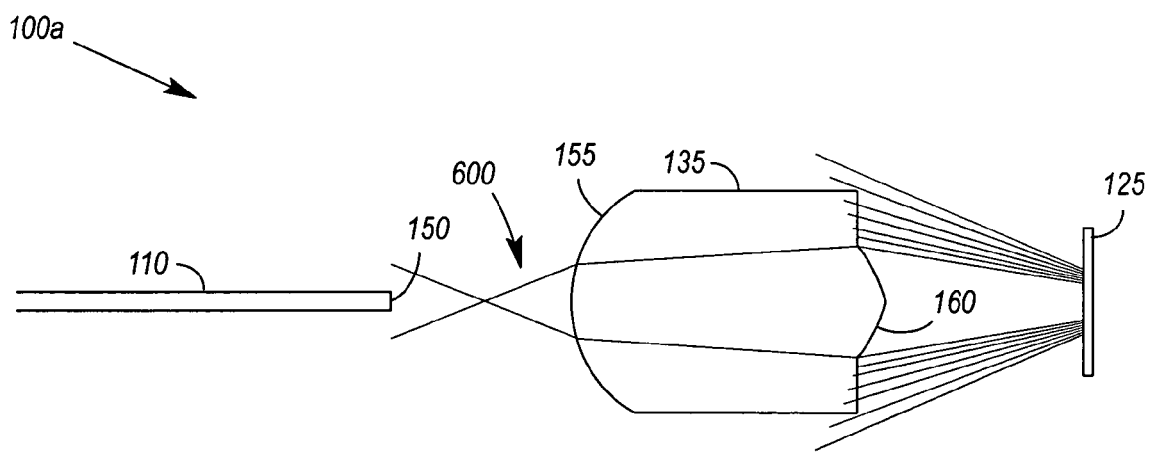
FIG. 6A illustrates a return path ray tracing for the system shown in FIG. 5A.

FIG. 6A illustrates a return path ray tracing 600 for the system 100a shown in FIG. 5A. As shown, the photodetector 125 reflects a percentage of its incident light. In some cases, the reflected light is on the order of 30%. However, this percentage depends on the characteristics of the photodetector 125 (e.g., its material, or the presence of an anti-reflective coating). In addition to focusing light on the photodetector 125, the image surface 160 bends back-reflected light to prevent it from reflecting back into the fiber 110. In addition, the diameter of the clear aperture of the image surface 160 may be smaller than the diameter of the object surface 155, such that the back-reflected light is no longer imaged at the plane of the fiber end face 150.

FIG. 6B illustrates the annular beam profile 650 of back-reflected light at the receiver end face 150 of the fiber 110. Of note, the beam profile illustrates the scattering of back-reflected light outside the diameter of the fiber 110 (and not into the fiber 110). While some optical systems employing past receiver lenses may couple in the range of 10% of back-reflected light into a fiber, the optical system 100a shown in FIG. 5A may couple in the range of 1.00% of back-reflected light into the fiber 110.

Figure 7:
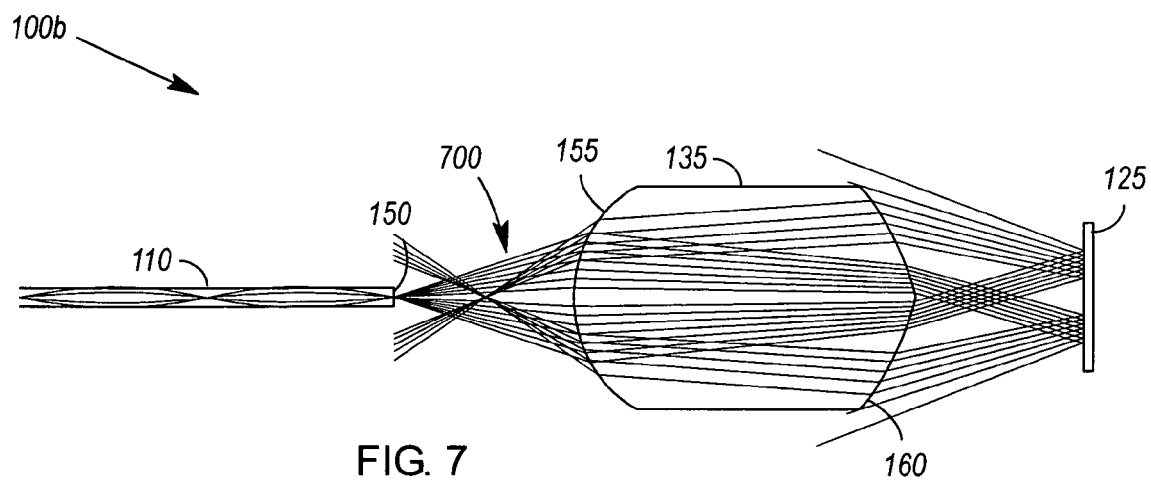
FIG. 7 illustrates a ray tracing for forward and return light paths of a second exemplary embodiment of the system shown in FIG. 1.

FIG. 7 illustrates a ray tracing 700 showing both forward (transmitted) and return (back-reflected) light paths for a second embodiment of the system 100 (system 100b). In this second embodiment 100b, the system's characteristics are as described in the foregoing embodiment 100a, with the following exceptions: length of lens 135 is 0.7 mm between vertex of object surface 155 and vertex of image surface 160, diameter of image surface 160 is 0.5 mm (same as object surface 155), distance between vertex of image surface 160 and photodetector 125 is 0.5 mm, distance between vertex of object surface 155 and receiver end face 150 of fiber 110 is 0.43 mm, the constants for the image surface 160 of lens 135 are d=−0.23, k=−2.66, and c=3.33 (radius of curvature of 0.3 mm).

In the system 100b, the image surface 160 has a larger diameter, and more back-reflected light enters the lens 135. However, the construction of the lens 135 still scatters back-reflected light outside the diameter of the fiber 110 (and not into the fiber 110).

The lens 135, including its object and image surfaces 155, 160, may be manufactured, for example, by injection molding a polymer such as polyetherimide (PEI) in, for example, a mold cavity formed by a diamond turning process. One suitable polymer is Ultem®, an amorphous thermoplastic PEI resin distributed by General Electric Company. Ultem® exhibits a high transmission coefficient at 850 nm and 1300 nm wavelengths, making it a suitable material for use in optical receiver, transmitter, and transceiver modules. Ultem® has a high glass transition temperature, approximately 215° C., allowing for high temperature solder or other processing of modules during manufacturing. The lens 135 may also be manufactured using other materials having suitable optical properties (e.g., other polymers, or glass), by means of injection molding, polishing or other processes.

Figure 8:
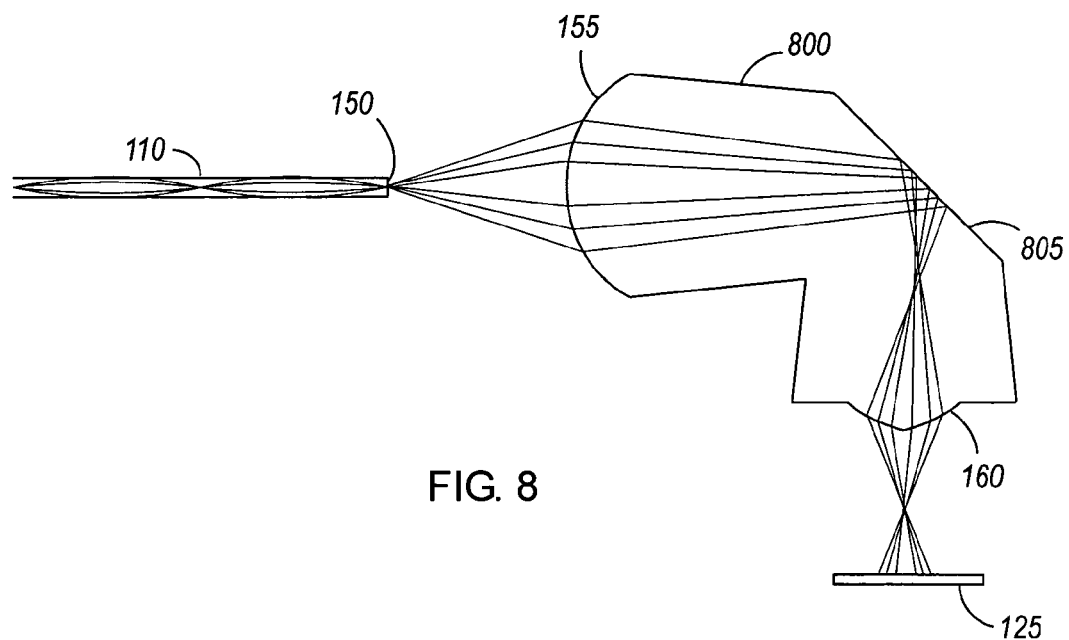
FIG. 8 illustrates an exemplary angular lens including the conic and cone combination image surface of the lens shown in FIG. 1.

FIG. 8 illustrates an exemplary angular lens 800 having an image surface 160 defined by composite conic and cone components. In contrast to the lens 135, the object and image surfaces 155,160 of the lens 800 are positioned at an angle with respect to each other (e.g., at approximately 90 degrees). The lens 800 further comprises a reflective surface 805, positioned between the object surface 155 and the image surface 160 to redirect (i.e., reflect) light received at the object surface 155 toward the image surface 160. Other than its bending of light rays, the lens 800 functions similarly to the lens 135.

Figure 9:
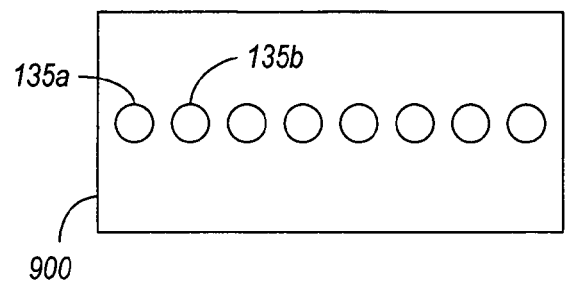
FIG. 9 illustrates an exemplary array of the lenses shown in FIG. 1.

In some cases, a plurality of the lenses 135 or 800 may be molded into a common structure to form a lens array. See, for example, the array 900 of lenses 135a, 135b shown in FIG. 9. A separate photodetector may then be positioned to receive light emitted from each of the lenses.

What is claimed is:

1. An optical receiver, comprising:
    a lens comprising:
        an object surface and an image surface, wherein the shape of the image surface is defined by an equation having a conic component and a cone component; and
        a reflective surface, positioned between the object surface and the image surface, to redirect light received at the object surface toward the image surface;
    a photodetector, positioned to receive light emitted from the image surface of the lens.

2. The optical receiver of claim 1, further comprising a housing, the housing holding at least the lens, and the housing comprising features to position the photodetector and an optical fiber with respect to the lens.

3. The optical receiver of claim 2, wherein the surfaces of the lens are optimized to mitigate return loss through the lens for the optical fiber, the light expected to be received via the optical fiber, and locations at which the housing positions the optical fiber and photodetector with respect to the lens.

4. The optical receiver of claim 1, wherein the shape of the image surface of the lens is defined by the equation:

$$z = \frac{c(x^2 + y^2)}{1 + \sqrt{1 - (1+k)c^2(x^2 + y^2)}} + d\sqrt{x^2 + y^2}$$

where z is a z-coordinate of the image surface, x and y are lateral coordinates of the image surface, k is a conic constant, c Is a reciprocal of a radius of curvature of the conic component, and d is a cone constant.

5. The optical receiver of claim 1, wherein the shape of the object surface of the lens is convex.

6. The optical receiver of claim 1, wherein a diameter of a clear aperture of the image surface is smaller than a diameter of the object surface.

7. The optical receiver of claim 1, wherein the lens further comprises a reflective surface, positioned between the object surface and the image surface, to redirect light received at the object surface toward the image surface.

8. The optical receiver of claim 1, wherein the reflective surface of the lens is oriented to redirect light by approximately 90 degrees.

9. The optical receiver of claim 1, wherein the surfaces of the lens are molded into a composite polymer material.

10. The optical receiver of claim 9, wherein the polymer material comprises a polyetherimide.

11. The optical receiver of claim 1, further comprising:
    at least one additional lens, wherein all of the lenses have similarly configured object and image surfaces, and wherein all of the lenses are molded into a common structure; and
    at least one additional photodetector, wherein each photodetector is similarly positioned with respect to a corresponding one of the lenses.

12. A lens comprising an object surface and an image surface, wherein the shape of the image surface is defined by an equation having a conic component and a cone component, and wherein the shape of the image surface is defined by the equation:

$$z = \frac{c(x^2 + y^2)}{1 + \sqrt{1 - (1+k)c^2(x^2 + y^2)}} + d\sqrt{x^2 + y^2}$$

where z is a z-coordinate of the image surface, x and y are lateral coordinates of the image surface, k is a conic constant, c is a reciprocal of a radius of curvature of the conic component, and d is a cone constant.

13. The lens of claim 12, wherein the shape of the object surface is convex.

14. The lens of claim 12, wherein a diameter of a clear aperture of the image surface is smaller than a diameter of the object surface.

15. The lens of claim 12, further comprising a reflective surface, positioned between the object surface and the image surface, to redirect light received at the object surface toward the image surface.

16. The lens of claim 12, wherein the reflective surface is oriented to redirect light by approximately 90 degrees.

17. The lens of claim 12, wherein the surfaces of the lens are molded into a polymer material.

18. The lens of claim 17, wherein the polymer material comprises a polyetherimide.

* * * * *